Patented Sept. 22, 1931

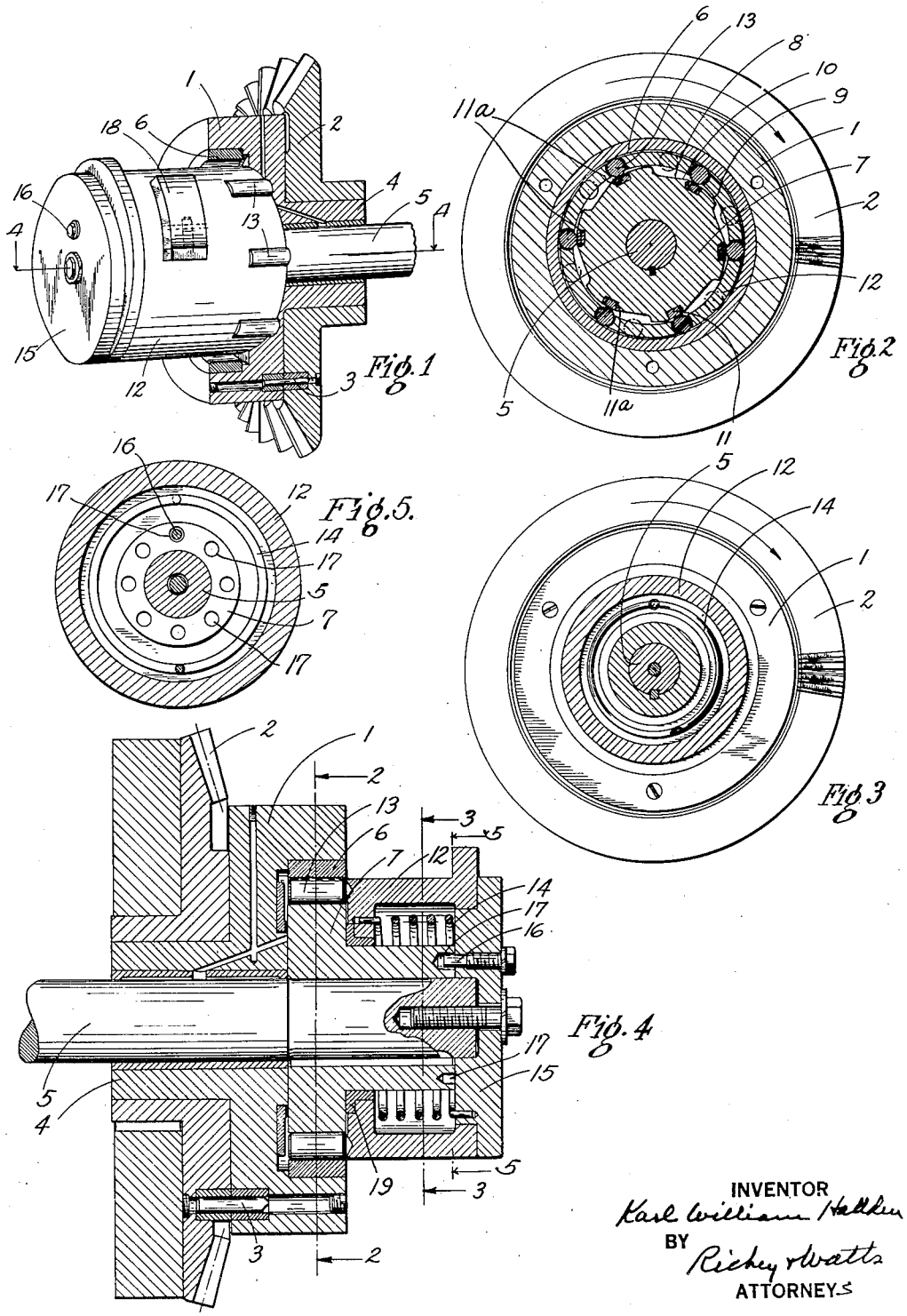

1,824,431

UNITED STATES PATENT OFFICE

KARL WILLIAM HALLDEN, OF THOMASTON, CONNECTICUT, ASSIGNOR, BY MESNE ASSIGNMENTS, TO STEEL AND TUBES, INC., OF CLEVELAND, OHIO, A CORPORATION OF OHIO (1928)

CLUTCH

Application filed April 21, 1928. Serial No. 271,718.

This invention relates to clutches and is particularly concerned with a clutch which is instantaneous in operation, is adapted to withstand heavy duty and severe usage, is inexpensive to construct and to maintain in working condition and is adaptable to use with single revolution devices for severing an article moving at a high rate of speed into pieces of substantially uniform lengths.

In the drawings accompanying and forming a part of this specification and in which one form of apparatus embodying my invention is shown, Fig. 1 is a perspective view, Fig. 2 is a transverse view, partly in section, taken on line 2—2 of Fig. 4, Fig. 3 is a sectional view taken on line 3—3 of Fig. 4, Fig. 4 is a sectional view taken on substantially the line 4—4 of Fig. 1, and Fig. 5 is a section taken about on the line 5—5 of Figure 4.

The apparatus shown in the drawings comprises a clutch housing 1 driven by a gear 2 secured thereto as by one or more shear pins 3 and extended to form a sleeve 4 through which a shaft 5 may extend. This housing is fitted with an annulus 6 of material harder than the rollers presently to be described.

A disc 7 is disposed in the housing 1 and is keyed to the shaft 5 with its periphery spaced apart from the inner surface of the annulus. The edge of this disc is provided with a plurality of notches 8 formed by substantially radial stop surfaces 9 and bottom surfaces 10 inclining upwardly at one or more angles to the stop surface 9 as more clearly shown in Fig. 2. Inserts 11 of a material harder than the material of the rollers and preferably corresponding to the hardness of the annulus 6 are positioned in the bottom of the notches at the points where the rollers are to be pinched between the annulus and the disc. The inserts 11 are held in place in the disc by means of keys 11a.

A hollow cylindrical basket 12 carries a plurality of rollers 13 loosely caged therein and projecting beyond the inner and outer surfaces of the basket, this basket being disposed between the annulus 6 and the disc 7 with the rollers disposed in the notches of the disc and engageable with the inner surface of the annulus and the inclined surfaces of the notches of the disc.

A coil spring 14 surrounds the shaft 5 and has one end secured to the basket and the other end secured to a cap 15 enclosing the end of the basket and secured to the shaft 5. The dowel pin 16 on the cap 15 may be set in any one of several dowel pin holes 17 in the end of the hub portion of the disc 7 by means of which adjustment of the tension of the spring on the basket may be controlled. The spring 14 is so coiled as to urge rotation of the basket in a direction to carry the rollers 13 to the points on the disc occupied by the inserts 11 where the rollers will be pinched between the disc and annulus. When the rollers are pinched between the disc and annulus, driving force will be transmitted from the housing through the rollers to the disc and thence to the shaft. A bearing ring 19 is interposed between the disc and basket to allow for easy relative movement of the two parts when the coil spring is brought into action.

The basket is provided with a projection 18 on its exterior for stopping engagement with a clutch tripping member. When the projection on the basket engages with the stopping mechanism (not shown) further rotation of the basket with the housing and disc will be prevented. The shaft will continue its rotary movement until the deeper parts of the notches pass under the rollers and the pinched engagement of the rollers between the annulus and disc is broken. The rollers can move radially in the basket sufficiently far to clear the annulus 6 when the rollers are in the deeper portions of the notches.

It will be understood from the foregoing description that the clutch is capable of practically instantaneous actuation due to the adjustable tension on the spring 14; and also that when the annulus and inserts in the disc are much harder than the rollers, the rollers will be freely and instantly engageable with and disengageable from the disc and annulus even under severe operating conditions; and if the rollers are scratched or worn sufficiently to impair their effectiveness, they may be quickly and inexpensively replaced. I have found that rollers, composed of a hard bronze, smooth and polish the surfaces of the harder annulus and inserts to a remarkable extent and make the device substantially instantaneous and uniformly positive in operation. It will further be noted that the rollers are all actuated into and out of pinched engagement simultaneously and by a single means and are not dependent for such actuation on a plurality of independently acting means.

What I desire to secure by Letters Patent is defined in what is claimed:

1. The combination with a shaft of a notched disc keyed to an end thereof, a rotatably mounted clutch housing surrounding said disc, a basket carrying a plurality of rollers said rollers being interposed between said clutch housing and said disc and arranged to provide a driving connection therebetween, said basket including a cylindrical flange projecting outwardly from said disc, a cap adjustably secured to the end of said shaft and closing the end of said basket, and a spring secured to said basket and said cap and housed therewithin.

2. In combination, a shaft, a sleeve keyed to an end thereof and having a notched disc spaced from the ends of the sleeve and shaft, a clutch housing surrounding said disc, a cylindrical basket surrounding and spaced from said sleeve and carrying a plurality of locking rollers interposed between said disc and housing and arranged to provide a driving connection therebetween, a cap secured to the end of said shaft and bearing in the end of said basket to close and support the same, and a spring connected to said basket and said cap, the latter being adjustable to vary the tension of the spring.

3. In combination a shaft, a sleeve keyed to an end thereof and having a notched disc spaced from the ends of the sleeve and shaft, a clutch housing surrounding said disc, a cylindrical basket surrounding and spaced from said sleeve and carrying a plurality of locking rollers interposed between said disc and housing and arranged to provide a driving connection therebetween, a cap disposed at the ends of said shaft and said sleeve, said cap bearing in said basket to close and support the same and including a flange overlapping the end of said basket, a spring within said basket and connected thereto and to said cap, and means securing said cap to said shaft to hold said sleeve and basket in assembled relation on said shaft.

4. In combination, a shaft, a sleeve keyed to an end thereof and having a notched disc spaced from the ends of the sleeve and shaft, a clutch housing surrounding said disc, a cylindrical basket surrounding and spaced from said sleeve and carrying a plurality of locking rollers interposed between said disc and housing and arranged to provide a driving connection therebetween, a cap disposed at the ends of said shaft and said sleeve, said cap bearing in said basket to close and support the same and including a flange overlapping the end of said basket, a spring within said basket and connected thereto and to said cap, means securing said cap to said shaft, and other means adjustably connecting said cap to said sleeve for rotation therewith.

In testimony whereof I hereunto affix my signature this 5th day of April, 1928.

KARL W. HALLDEN.